Figure 1:
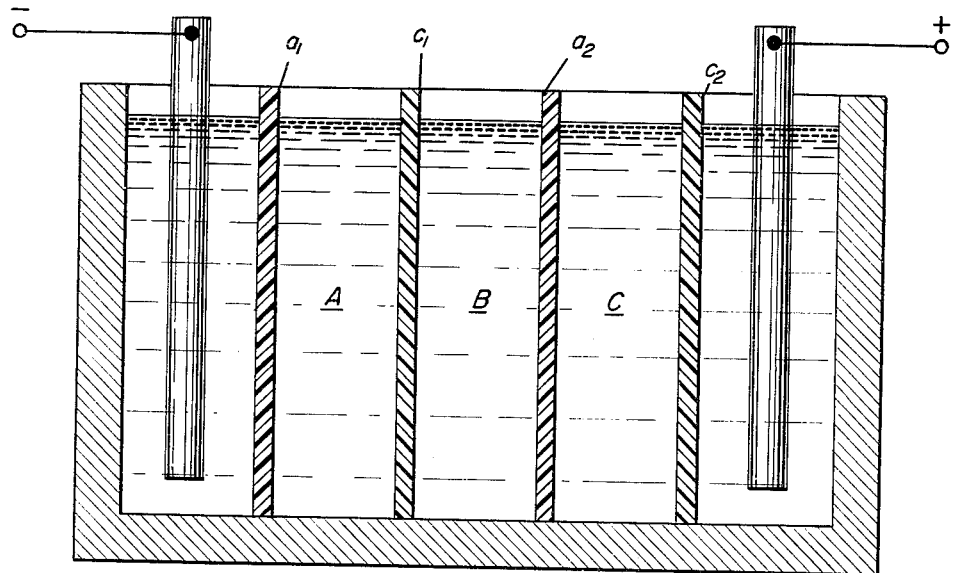

INVENTORS
Tsutomu Kuwada
Sadao Yoshikawa
Yujiro Hara
Toshisaburo Yamana by Nenderoth, Lind & Ponack
ATTORNEYS United States Patent Office 3,231,485
Patented Jan. 25, 1966

3,231,485
PROCESS FOR PURIFYING AMINO ACIDS
Tsutomu Kuwata, Sadao Yoshikawa, and Yujiro Hara, all of Tokyo, and Risaburo Yamana, Osaka, Japan, assignors to Takeda Chemical Industries, Ltd., Osaka, Japan
Filed Jan. 23, 1961, Ser. No. 127,752
Claims priority, application Japan, Jan. 23, 1960, 35/2,187
2 Claims. (Cl. 204—180)

The present invention relates to the purification of amino acids.

Amino acid solutions, prepared by the hydrolysis of animal or vegetable protein, usually contain colored impurities as well as odorous impurities in the dissolved state. For the purification of such solutions, resort has heretofore been made to a wide variety of methods, including adsorption methods using various adsorbents, ion exchange methods, dialytic methods using semi-permeable membranes, and other methods, but certain colored and odorous impurities have resisted removal by any of these and thus represent a serious obstacle to the complete purification of amino acids according to prior art methods.

The aforesaid colored and odorous impurities are unavoidably produced as byproducts of the above-mentioned hydrolytic preparation of the amino acids and cannot be removed by the usually applicable and most convenient method of absorbing such impurities on active carbon.

It is known that the colored as well as the odorous impurities are the result of recombination reactions occurring between nitrogen- and/or sulfur-containing compounds derived from constituents of the protein molecules and set free during the hydrolysis of the animal or vegetable proteins when producing amino acids from the latter starting materials. Among those impurities which cannot be removed by any of the known purification methods, there are in particular certain yellow-colored impurities which especially escape adsorption on active carbon, ion-exchange resins, and the like materials conventionally employed for purification of organic matters.

Similarly, impurities imparting a scorched or a seaweed odor to the amino acids produced in the form of aqueous hydrolyzates from proteins cannot be removed by adsorption on the aforesaid known adsorbents.

The art therefore has resort to very complicated processes which require, among other steps, the cumbersome separation of individual amino acids from the hydrolyzates obtained by crystallization, electrophoresis, chromatography, etc. and the resulting individual, purified amino acids are then re-mixed and re-dissolved in order to obtain the desired pure solutions. This entire procedure is highly uneconomical.

It is the main object of our invention to provide a process for the purification of amino acids which avoids the complicated methods now used in the art, and yields highly pure aqueous solutions of amino acid mixtures directly from the crude hydrolyzates which are the result of the conventional methods of the hydrolysis of proteins.

This and other objects, which will become apparent from the description of our invention given hereinafter, are attained, according to the said invention, by a process of purifying amino acids in liquid medium, and particularly the crude amino acid-containing hydrolyzate obtained by the hydrolysis of proteins, which novel process comprises the steps of (a) electrodialyzing at a current density of about 0.3 to 0.8 ampere per square decimeter and from a purification zone charged with the crude hydrolyzate, or a similar liquid medium which contains the amino acids, contaminated with colored and odorous impurities, a portion of said contaminated material through a permselective zone of solid, porous water- and resin polymer-containing ion-exchange material having a water content of at least 40% by weight up to a maximal amount compatible with the stability of the ion-exchange material, the degree of cross linking in ion-exchange material corresponding to a mean pore size ranging from about 5 to 20 Angstroms, into a receptor zone charged with an electrically conductive aqueous medium, whereby the aforesaid portion of the hydrolyzate migrates together with said impurities out of said purification zone, and (b) interrupting the electrodialysis as soon as the hydrolyzate in said purification zone has attained a determined degree of purity.

More particularly, the crude liquid, amino acids-containing medium contaminated with the colored and/or odorous impurities is charged into a purification zone which is disposed intermediate two electrode zones comprising electrodes having a positive and a negative electrical potential, respectively; electrodialysis takes place in the direction toward said electrode zone of positive potential through an anion-permselective zone of solid, porous water- and resin polymer-containing anion-exchange material having a water content higher than 45% and up to about 60% and more by weight, and in the direction toward said negative electrode zone through a cation-permselective zone of solid, porous water- and resin polymer-containing cation-exchange material having a water content higher than 40% and up to 60% and more by weight, which permselective zones are each in direct electrodialytic contact with the purification zone; the upper limit of the water contents of both the ion-exchange materials must be compatible with the requirements of stability of the latter. Electrodialysis is effected in this case through the aforesaid permselective zones in the electrically conductive aqueous media provided in electrodialytic contact with each of said permselective zones at the end thereof opposite the purification zone. The remaining conditions of the process are the same as described hereinbefore.

The above-mentioned water contents are calculated on the basis of the total weight of the resin comprising of the membrane.

The amino acid solutions which are used as starting liquids in the process of the invention comprise the hydrolyzates obtained by the hydrolysis of animal or vegetable proteins with mineral acids such as hydrochloric acid, sulfuric acid, and the like, or with caustic alkali such as sodium or potassium hydroxide, or with enzymes such as pancreatin, pepsin, tripsin, papain and the like, as well as the aqueous amino acids solutions produced by the metabolism of a microorganism such as *Micrococcus glutamicus* and the like, amino acid solutions which have been previously purified with active carbon, active clay, ion-exchange resins, and the like, can also be used. The impure components contained in the solutions are largely secondary decomposition products of proteins and/or amino acids themselves.

As a further important feature of our invention, the crude liquid medium containing amino acids as the essential constituents contaminated with the above-described impurities, should be present in the purification zone at a pH of approximately neutral (5.5–7) and is correspondingly adjusted, if necessary, by the addition of sodium hydroxide or hydrochloric acid.

The receptor zone or zones are charged with an aqueous solution of an electrolyte which is dissolved in water in amounts just sufficient to impart to the latter the electrical conductivity required for carrying out the electrodialysis.

The aqueous receptor solutions used in these zones are aqueous solutions containing as the aforementioned electrolyte, particularly a water-soluble alkali metal salt of a mineral acid, for instance sodium chloride, sodium sulfate, and the like, which salt is dissolved in water in amounts of about 0.1 to 1 gram per 100 grams of water. Furthermore, electrolyte solutions which are used when carrying out the process of the present invention in a multi-chamber system of the type described further below, contain preferably a water-soluble alkali metal salt of an organic acid such as sodium oxalate, sodium or potassium tartrate, sodium citrate, sodium or potassium acetate, and the like, in addition to the aforementioned water-soluble alkali metal salt of an inorganic acid.

The electrode zones mentioned hereinbefore are charged with aqueous solutions containing the above enumerated organic acid salts as well as inorganic electrolytes such as sodium or potassium chloride, sodium sulfate or the like.

The electrodes dipping into these electrode solutions are of the material conventionally used in electrodialysis, namely graphite, platinum, lead as anode and graphite, platinum, nickel, stainless steel iron as cathode.

Each of these electrode zones is separated from one of the receptor zones by one of the permselective zones, so that the respective electrode zone and the receptor zones are in electrodialytic contact with each other through the permselective zone. The permselectivity of the last mentioned permselective zone is opposite to that of the permselective zone which separates the respective receptor zone from the purification zone.

Current density in the electrodialytic process of the invention is another critical factor therein. If the current density is too high above the range stated hereinbefore, the service life of the ion-exchange membranes which constitute the permselective zones will be shortened, moreover, electrolysis of water will occur which causes a change in the hydrogen ion concentration of the amino acid solution in the purification zone. Therefore, we employ in the purification of the amino acid solutions an electrlyte current density which is below the critical density causing such electrolysis of water. The range of about 0.3 to 0.8 amperes per square decimeter stated hereinbefore, safely avoids such detrimental effects. When carrying out the process according to the invention in the above-described manner and with the above-described solutions in the various zones, the hydrogen ion concentration of the amino acid solution in the purification zone is maintained constant, thereby achieving a steady, undisturbed purification.

*Preparation of permselective membranes*

The permselective zones in the process according to the invention are constituted preferably by permselective membranes which are either anion- or cation-selective, as the case may be, and which are assembled together with the electrodes in an electrodialysis cell.

These membranes serving as diaphragms in the process of the invention consist essentially of a polymeric ion-exchange resin material which has been specially treated to have the critical water content and mean pore size stated hereinbefore.

Certain membranes which can serve as starting membranes for the special treatment to be described hereinafter, are described in Japanese Patents 248,669 and 239,724 and British Patent 793,212 from which cation-selective membranes required in the process of our invention can be prepared, and others are described in Japanese Patent 239,596 and British Patent 804,176, which serve for the preparation of anion-selective membranes suitable in the present process.

The first-mentioned membranes which are selectively permeable, to cations, have acceptable tensile and conductivity properties and freedom from cracking when in use, and are obtained by sulfonation of a film comprising a copolymer of an aromatic mono-vinyl compound with a linear aliphatic polyene hydrocarbon, said copolymer containing from about 30 to 70% by weight of the aromatic vinyl compound. "Copolymer" as used herein means a copolymer itself as well as its vulcanized products.

Examples of aromatic monovinyl compounds are styrene, vinyl toluene, vinyl xylene, ethyl styrene, and diethyl styrene. Examples of suitable linear aliphatic polyene hydrocarbons are butadiene and isoprene.

The preferred sulfonating agent is concentrated sulfuric acid, because it permits a relatively mild sulfonation; oleum with less than 20% $SO_3$ and chlorosulfonic acid can also be used. The sulfonation temperature should be close to room temperature and preferably below 50° C.

The above-mentioned membranes which are selectively permeable to anions and which are described, for instance in British Patent 793,212 supra, consist of vulcanized or cyclized copolymers of an aromatic vinyl compound such as the above-enumerated styrene, vinyl toluene, vinyl xyelene and ethyl styrene as well as methyl styrene and methylvinylpyridine, and an aliphatic conjugated polyene compound such as butadiene, isoprene and 1,3,5-hexatriene. Most suitable are the copolymers which contain about 25 to 75% by weight of the aromatic vinyl compound, preferably styrene.

The above-described copolymers are first subjected to a cross-linking reaction which determines the degree of porosity and then either to sulfonation whereby cation-permeable membranes are obtained, or to a special chloroalkylation and to an amination, whereby amino groups are introduced at the aromatic nuclei of the polymer molecules. Finally the aminated product is converted to the quaternary ammonium salt, whereby a negative group is introduced into the resin.

We prefer to apply the copolymer latex of the desired content of aromatic vinyl compound to a support of glass fiber cloth having a thickness in the order of about 0.05 to 0.25 millimeter in such amounts that the latex content of the resulting composite product is about 30 to 70% by weight.

This initial latex-glass fiber membrane is dipped into a cross-linking agent constituted by a solution of a weakly active Friedel-Crafts catalyst in a suitable organic solvent, for example, tin tetrachloride in n-hexane, or aluminum chloride in chloromethyl ether, at a temperature of 20° to 40° C., and preferably at about 30° C. for about 30 to 180 minutes, and preferably for about 60 minutes, whereby depending on the composition of the latex, there is achieved a cross-linking which imparts to the copolymer a coarse network structure, and correspondingly to the membrane the desired porosity, i.e. a mean pore size within the range of about 5 to 20 Angstroms.

Weakly active Friedel-Crafts catalysts suitable in the cross-linking step described above are anhydrous stannic chloride, titanium chloride, aluminum chloride-ether complex and zinc chloride.

Solvents for these catalysts are n-hexane, tetrachloroethane, chloroform, carbon tetrachloride, carbon disulfide and trichloroethylene.

The above-mentioned critical water content of the membrane is calculated on the basis of the total weight of the resin comprising of the finished membrane excluding supporting material, as shall be explained in detail further below.

The anion of the above-described quaternary ammonium salt is either chlorine or another acid capable of quaternating the copolymer amino derivatives.

The longer the treatment within the above-stated time range, and the lower the content of the aromatic vinyl groups in the copolymer, the finer are the pores of the resulting membrane.

The latter is then either dipped in concentrated sulfuric acid (96% $H_2SO_4$) for several hours to achieve sulfonation and thereby obtain the membrane ready for use in the process according to our invention.

Or the resulting membrane is subjected to the aforementioned chloroalkylation, preferably to chloromethylation with chloromethylether at about 20 to 40° C., and then to a treatment with triethylamine-ethanol solution at room temperature. Washing of the resulting membrane with methanol yields a suitable anion-selective membrane of the quaternary ammonium type ready for use in the present process.

The critical water content of the final membrane is principally determined by that of the latex. Control of the water content in the latter during emulsion polymerization is conventional. The subsequent treatments of the latex-glass fiber membrane described hereinbefore do not materially effect this water content since they are all carried out at moderate temperatures not exceeding about 50° C. and usually lower, in the order of 20 to 30° C.

Theory of process

The process according to our invention is based on the important discovery that the above-discussed impurities which are not adsorbable on active carbon, migrate out of the purification chamber substantially entirely with a first portion of amino acids, subject to the critical data given hereinbefore with regard to the ion-exchange materials which constitute the permselective zones, and subject to the other process conditions stated above; consequently, after the impurities have substantially entirely migrated out of the purification zone, electrodialysis can be interrupted, and a mixed amino acid solution with the desired degree of purity is retained in the purification zone.

We have found also that the colored and odorous impurities which are found in protein hydrolyzates in the production of amino acid solutions, and which cannot be adsorbed on active carbon, are substances which have considerably higher molecular weight than the amino acids in the hydrolyzate, and have preponderantly negative charge in neutral solution. These impurities form complex salts or molecular compounds by association with other molecules in the hydrolyzate, for instance amino acid molecules or the molecules of other intermediate degradation products of the hydrolysis of the protein, thereby increasing considerably the molecule size of the resulting associated molecule above the average size of the amino acid molecules present.

Impurities constituted preponderantly or exclusively by negatively charged molecules can be withdrawn from the purification zone through the zone constituted by anion-exchange materials toward the anode side. An electrodialytic membrane of anion-exchange material having fine pores in the order of 5 to 10 Angstroms up to about 20 Angstroms is satisfactory for use as the anion-exchange zone. The porosity of such membrane is determined by correspondingly selecting the degree of crosslinking in the polymerizate constituting essentially the body of the membrane.

However, the above-described types of impurities having larger associated molecules cannot be removed by electrodialysis through the described anion exchange membranes, even though the latter have enlarged pores in the order of 20 Angstroms.

We have found that, surprisingly, these larger molecular impurities can be removed successfully by electrodialytic contact, not only with an anion-exchange membrane of the type already described above, but at the same time with a cation-exchange membrane, also of the specific type and properties that have already been described.

By simultaneously electrodialyzing the amino acids-containing liquid medium from the purification zone through the anion-exchange membrane toward the positive electrode, and through the cation-exchange membrane toward the negative electrode, it is possible to remove even the large associated molecule impurities from the purification zone in such time that the electrodialysis treatment can be interrupted after a relatively short time, for instance from about 120 to 180 minutes, depending on such factors as the nature of the amino acid mixture, the type of protein hydrolyzed, and the dimensions of the electrodialysis cell and, of course, the total volume of the crude liquid medium proportionate to the surface of the membrane or membranes in contact therewith.

Without being bound thereto, we believe that, under the influence of the electrical field applied during electrodialysis, the large associated molecules of the otherwise unremovable impurities are dissociated into positively charged amino acid the likewise positively charged unknown impurity molecules and into the above-discussed negatively charged impurity molecules. The negative impurities can now pass through the anion-exchange membrane toward the receptor solution on the anode side, i.e. the side of the positive electrode, while the positive dissociated impurity molecules of the initially associated molecules can now pass through the cation-exchange membrane into the receptor liquid disposed toward the cathode (negative electrode) side.

Electrodialysis cell

Figure 2:
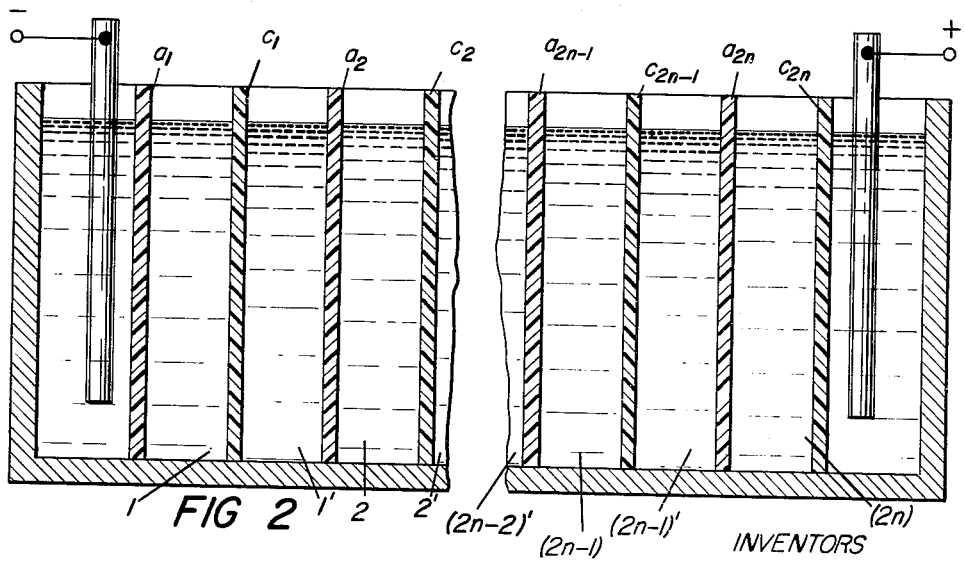

In the accompanying drawing, FIGURE 1 illustrates schematically a simple electrodialysis cell unit adapted for carrying out the process according to the invention, while FIGURE 2 shows a purification apparatus consisting of a plurality of the cell units illustrated in FIGURE 1.

Each of the two apparatus shown in these figures is provided with a negative and a positive electrode. The cell unit shown in FIGURE 1 is housed in a trough which is separated by four transverse permselective membranes into five chambers, of which the end chambers contain the negative and the positive electrode, respectively, while between these outer electrode chambers there are provided three chambers, namely, the central chamber B which is destined for receiving the amino acid solution to be purified, while chambers A and C are filled during operation with the liquid receptor medium. The electrode chambers are filled with liquid electrolyte.

The electrode chamber housing the negative electrode is separated from the next-adjacent receptor chamber A by an anion-selective membrane $a_1$, the latter from the central or purification chamber B by a cation-selective membrane $c_1$, the purification chamber is separated at its opposite end from the other receptor chamber C by a second anion-selective membrane $a_2$, and the chamber C is in turn separated from the electrode chamber containing the positive electrode by a second cation-selective membrane $c_2$.

In the apparatus shown in FIGURE 2, $2n$ cell units are combined in the following manner ($n$ being a positive integer). Between the end chambers, which again house a negative and a positive electrode, respectively, there are arranged in series in the following order next following the electrode chamber housing the negative electrode:

anion-selective membrane $a_1$
receptor chamber 1
cation-selective membrane $c_1$
purification chamber 1'
anion-selective membrane $a_2$
receptor chamber 2
cation-selective membrane $c_2$
purification chamber 2'
. . .
purification chamber $(2n-2)'$
anion-selective membrane $a_{2n-1}$
receptor chamber $(2n-1)$
cation-selective membrane $c_{2n-1}$
purification chamber $(2n-1)'$
anion-selective membrane $2n$
receptor chamber $2n$
cation-selective membrane $2n$, and finally the electrode chamber housing the positive electrode.

The operation of these electrodialysis cells during the process of the invention is explained further below in connection with a number of examples which illustrate the invention without limiting its scope.

*Operation of electrodialysis cell*

In practicing the process according to the invention, a part or the whole of those acidic or basic amino acids present in the solution being purified which are not at their isoelectric points of neutral amino acids, are transferred together with the impurity components through the diaphragms and thus removed from the purification zone. This is of special advantage in preparing amino acid solutions which are to be used for medicinal purposes. In these cases, it is usually required that the purification of the amino acid solution comprises also the removal of acidically reacting amino acids therefrom at the same time, and it is a special advantage of the process of the present invention that it permits to attain both the elimination of colored and odorous impurities and of the acidic and/or basic amino acids simultaneously. Amino acids, obtained by a process of the present invention, are very useful as seasoning agents, medicines and in food products. The process of the present invention is highly effective and forms the basis for the commercial purification of amino acid solutions with broad applications in many fields.

EXAMPLE 1

An electrodialytic cell as shown in FIG. 1 is used, which is so dimensioned that the distance between each end wall of the trough and the membrane placed nearest the respective end wall, on the one hand, and the distance between two membranes placed adjacent each other are all equal, the end walls of the trough and all of these membranes being installed parallel to each other and at right angle to the longitudinal axis of the trough. The inner side walls of the trough and the membranes have each a surface area of $7.5 \times 7.5$ cm.$^2$, and the trough is 5 cm. long. A nickel electrode having a surface area of $7 \times 7$ cm.$^2$ is used as anode. The ion-exchange membranes serving as diaphragms consist of a styrene-butadiene copolymer, the cation-exchange membranes being the sulfonated product of the said copolymer designated as C–1 in Tables 1 and 2 below. The anion-exchange membranes are quarternary ammonium salt type membranes, prepared by chlormethylation and subsequent amination of the said copolymer and more particularly anion-selective membrane $a_2$ corresponds to A–3 in Tables 1 and 2 below. Both electrode chambers are filled with a 3% sodium sulfate solution, the receptor chambers A and C are each charged with 0.2% sodium chloride solution, and the purification chamber B is charged with 60 cc. of an amino acid solution having a pH of 5.8 and a concentration of about 20% by weight, obtained by the hydrolysis of casein with sulfuric acid. Electrodialysis is then carried out at an initial current density of 0.5 A./dm.$^2$, and the passage of electric current is interrupted after 150 minutes. The acidic amino acids together with impurities having the typical hydrolysis odor have been transferred into the solution of the receptor chamber C. The solution of the amino acids remaining in the chamber B is odor-free and shows a pH of 6.0. The concentration of this purified solution is 11% amino acid.

EXAMPLE 2

The same electrolytic cell and electrodes as in Example 1 are used. As diaphragms, cation-exchange membrane designated as C–2 and anion-exchange membrane designated as A–3 in Tables 1 and 2 below are employed. Each of two electrode chambers and the intermediate chambers A, B and C are filled with the same solutions as used in corresponding chambers in the preceding example. When carrying out electrodialysis at an electric current density of 0.5 A./dm.$^2$, the flow of electric current ceases almost completely about 2.5 hours later and the process is interrupted. At that time it is observed that odorous and colored impurities which cannot be adsorped on active carbon, as well as acidic amino acids have been transferred into the solution in receptor chamber C, and colorless, odorless purified amino acid solution having a pH of 6.2 is obtained in chamber B after treating the solution in this chamber with a small amount (0.2 gram) of active carbon.

The manufacture of suitable cation- and anion-selective membranes and the criticality of the water content of the latter is illustrated by the following examples and tables (all parts and percentages are by weight unless stated otherwise). The determination of the water content is discussed further below.

EXAMPLE 3

A latex of a styrene-butadiene copolymer having a styrene-butadiene ratio of 46:54 (by weight) is prepared by emulsion polymerizing under the conditions described in G. F. Whitby; Synthetic Rubber, pages 175–196 (John Wiley & Sons, Inc., New York).

The resulting latex contains about 40% of water. 4.5 to 4.7 kg. of this latex is applied to 5.5 kg. of glass fiber cloth having a thickness of about 0.10 millimeter, and there is obtained an initial latex-glass fiber membrane having a latex content of about 45 to 47%. This membrane is immersed in a 20% SnCl$_4$ solution in n-hexane at 30° C. for 60 minutes, thereby effecting a cross-linking reaction in the latex, and the cross-linked membrane is then immersed for 6 hours in a mixture consisting of 15% chloromethyl ether, 5% SnCl$_4$ and 80% tetrachloroethane at 30° C., thereby chloromethylating the copolymer in the membrane. The membrane is then washed with methanol and thereafter immersed in a saturated triethylamine solution in ethanol at room temperature for 16 hours. After washing with methanol, an anion-permselective membrane of the quaternary ammonium type is obtained which has a water content of 49.1% and a mean pore size of about 10–15 Angstroms. Other properties of this membrane which is designated as A–3 can be seen from Tables 1 and 2 below.

EXAMPLE 4

An initial latex-coated glass fiber membrane obtained as described in the first part of Example 3 is immersed for 17 hours at 25° C. in a mixture of 2% of n-hexane and 98% of SnCl$_4$, thereby effecting cross-linking in the copolymer. After washing with methanol, the membrane is then immersed in a 96% concentrated sulfuric acid at 25° C. for 17 hours, thereby effecting the introduction of sulfonic groups into the copolymer. The resulting cation-permselective membrane has a water content of 51.4 and a mean pore size of about 10–15 Angstroms.

The membranes obtained as described in Examples 3 and 4 have good strength and durability because of their inclusion of glass fiber as supporting material.

The water content given in the preceding examples and other properties of the permselective membranes according to our invention are determined as follows:

The ion-exchange capacity A$_R$ per one gram of ion-exchange membrane per one gram of sodium type dry membrane is expressed in milli equivalents (m. eq.).

The water content W is a numerical value calculated according to the formula below from the weight $a$ of a resin when wet and the weight $b$ of the same resin when dried at about 110° C. by the following equation:

$$W = \frac{a-b}{a}$$

The ion concentration in a membrane A$_W$ is a value in which the ion-exchange amount per one gram of water in an Na-type ion-exchange membrane in wet state and is expressed in milli equivalents calculated from $A_R$ and W by the formula:

$$Aw = \frac{A_R(100-W)}{W}$$

The permeability K, or water penetration ratio, is a value obtained by the measurement of the transferred amount of water V by osmotic pressure, when pure water and a solution are contacted through the ion-exchange membrane being tested, said value being expressed in cm.$^2$ and calculated by the formula $$K = \frac{VN\eta}{SHT}$$

wherein V is the amount of water which has penetrated the membrane; N is the thickness of the membrane; $\eta$ is the viscosity of the water; S is the effective cross-sectional area of the membrane; H is the osmotic pressure and T is the temperature (in ° Kelvin).

Experimental results obtained with various combinations between several different anion- and cation-exchange membranes are given below in Tables 1 and 2. In these experiments, the comparative values relating to the porosity of the ion-permselective membranes used are approximately expressed with reference to the water content W in the copolymers forming the said membranes and to the permeability to water, i.e. the pater penetration ratio K. In these experiments, an electrodialytic cell of the type shown in FIG. 1 is used in which the order of the anion- and cation-exchange membranes is inverted. The intermediate chambers confined by these membranes are charged respectively, with an amino acid solution having approximately neutral hydrogen ion concentration, obtained by the hydrolysis of protein, and with the above-described receptive solution. During electrodialysis, the transfer of impure components dialyzed through anion-exchange membranes and the progressing purification of the amino acid solution are observed in order to evaluate the quality of the ion-exchange resin membranes. The tested membranes are designated as C-1, C-2, A-1, A-2 and A-3, respectively.

exchange membrane with a water content ranging from 31.4% to 49.1%, and the results show that only when a combination between cation-exchange membrane with the water content of more than 40% and anion-exchange membrane with that of more than 45% is employed, a successful purification can be achieved. The combination between cation-exchange membrane C-2 and anion-exchange membrane A-3 as seen in Table 2 meets the purification requirements, and the reference to the property of ion-exchange membranes in Table 1 clearly show that other combinations than the above-specified one fail to accomplish the desired results.

We claim:

1. A process for the purification of an aqueous media of protein hydrolyzate having a pH between 5.5 and 7 and containing, as essential constituents, amino acids contaminated with colored and odorous impurities, which comprises:

(a) electrodialyzing, at a current density of about 0.3 to 0.8 ampere per square decimeter, a portion of the said aqueous media of protein hydrolyzate contaminated with colored and odorous impurities, from a purification zone charged with said aqueous media of protein hydrolyzate and disposed intermediate two electrode zones having a positive and a negative electrical potential, respectively, in the direction toward said positive electrode zone through an anion-permselective zone consisting essentially of solid, porous anion-exchange resin polymer having a water content between 45% and about 60% by weight, said anion-exchange resin polymer being a quaternary ammonium salt of a butadiene-styrene copolymer having a butadiene-styrene ratio, by weight, of from 70:30 to 30:70 calculated on the dry copolymer, and simultaneously in the direction toward the negative electrode zone through a cation-selective zone consisting essentially of solid, porous, sulfonic acid, cation-exchange resin polymer having a water content between 40% and about 60% by weight, and the degree of cross-linking in both ion-exchange materials corresponding to mean pore sizes in the range of Table 1.—Property of ion-exchange membranes

| Type | Capacity of ion-exchange radical in membrane (meq./g.) | Concentration of ion-exchange radical in membrane (meq./g.) | Water content of membrane W (percent) | Water penetration ratio K($\times 10^{-16}$ cm.$^2$) |
|---|---|---|---|---|
| Cation-exchange membrane, C-1 | 1.50 | 2.93 | 33.8 | 0.24 |
| Cation-exchange membrane, C-2 | 2.19 | 2.13 | 51.4 | 0.54 |
| Anion-exchange membrane, A-1 | 1.69 | 3.91 | 31.4 | 0.18 |
| Anion-exchange membrane, A-2 | 1.69 | 3.16 | 34.9 | 0.23 |
| Anion-exchange membrane, A-3 | 1.78 | 1.84 | 49.1 | 0.45 |

Table 2.—Purification of amino acid solutions with several combinations of membranes

| Exp. No. | Type of cation-exchange membrane | Type of anion-exchange membrane | Transfer of colored materials non-adsorptive on active carbon | Transfer of odorous impurities | Evaluation |
|---|---|---|---|---|---|
| 1 | C-1 | A-1 | — | — | Not usable. |
| 2 | C-2 | A-1 | — | — | Do. |
| 3 | C-2 | A-2 | — | — | Do. |
| 4 | C-1 | A-3 | — | + | Removes only part of odorous impurities. |
| 5 | C-2 | A-3 | ++ | ++ | Usable. |

The experiments were carried out by using several combinations between cation-exchange membrane with a water content ranging from 33.8% to 51.4% and anion-about 5 to 20 Angstroms, into electrically conductive aqueous media in electrodialytical contact with said zones of said anion- and of said cation-exchange resin polymers, respectively, whereby the aforesaid portion of the said aqueous media of protein hydrolyzate migrates together with said impurities out of said purification zone, and (b) interrupting the electrodialysis as soon as the amino acid solution in said purification zone has attained a determined degree of purity.

2. The process described in claim 1, wherein the electrically conductive media are aqueous solutions of alkali metal salt of inorganic acid in mixture with water-soluble alkali metal salt of organic acid.

References Cited by the Examiner

UNITED STATES PATENTS

| | | | |
|---|---|---|---|
| 2,854,393 | 9/1958 | Kollsman | 204—180 |
| 2,863,813 | 12/1958 | Juda et al. | 204—180 |
| 2,957,206 | 10/1960 | Mindich et al. | 204—180 |
| 2,978,393 | 4/1961 | Hoch et al. | 204—180 |
| 2,978,402 | 4/1961 | Hoch et al. | 204—301 |
| 2,987,464 | 6/1961 | Wilson et al. | 204—301 |
| 3,004,909 | 10/1961 | Gregor et al. | 204—180 |
| 3,051,640 | 8/1962 | Traxler | 204—180 |

FOREIGN PATENTS

| | | |
|---|---|---|
| 793,212 | 4/1958 | Great Britain. |
| 804,176 | 11/1958 | Great Britain. |

OTHER REFERENCES

Wilson "Demineralization by Electrodialysis," 1960, published by Butterworths, London, pages 89–91, 108–11.

JOHN H. MACK, *Primary Examiner.*

JOHN R. SPECK, WINSTON A. DOUGLAS, *Examiners.*